United States Patent
Knell et al.

(10) Patent No.: US 10,669,434 B2
(45) Date of Patent: Jun. 2, 2020

(54) CORROSION RESISTANT COATINGS FOR METAL SURFACES

(71) Applicant: VCI COATINGS, LLC, Pittsburgh, PA (US)

(72) Inventors: Timothy Alan Knell, McMurray, PA (US); Robert Walde, Haymarket, VA (US)

(73) Assignee: VCI COATINGS, LLC, Pittsburgh, PA (US)

( * ) Notice: Subject to any disclaimer, the term of this patent is extended or adjusted under 35 U.S.C. 154(b) by 0 days.

(21) Appl. No.: 16/047,327

(22) Filed: Jul. 27, 2018

(65) Prior Publication Data

US 2018/0340080 A1 Nov. 29, 2018

Related U.S. Application Data

(63) Continuation-in-part of application No. 14/757,110, filed on Nov. 19, 2015, now abandoned, which is a continuation-in-part of application No. PCT/US2014/045268, filed on Jul. 2, 2014.

(51) Int. Cl.
*C09D 5/08* (2006.01)
*C09D 7/63* (2018.01)
*C09D 163/00* (2006.01)
*C08K 5/17* (2006.01)

(52) U.S. Cl.
CPC ............ *C09D 5/086* (2013.01); *C09D 7/63* (2018.01); *C09D 163/00* (2013.01); *C08K 5/175* (2013.01)

(58) Field of Classification Search
CPC ......... C09D 5/086; C09D 7/63; C09D 163/00
USPC ....................................................... 523/455
See application file for complete search history.

(56) References Cited

U.S. PATENT DOCUMENTS

| 4,072,626 A * | 2/1978 | Finney ................ C23F 11/08 106/14.15 |
| 2011/0165330 A1* | 7/2011 | Rawlins .............. C09D 5/084 427/386 |
| 2012/0149608 A1* | 6/2012 | Meyer ................... C09K 8/54 507/244 |

FOREIGN PATENT DOCUMENTS

GB 650118 A * 2/1951 ............ C10M 1/08

* cited by examiner

*Primary Examiner* — David T Karst

(57) ABSTRACT

A novel solution of an amine carboxylate. type of vapor phase migratory corrosion inhibitor (VCI), suitable for use as part of a corrosion resistant coating for metal surfaces. The solution contains a high concentration of the amine carboxylate VCI, thus facilitating, on application of the coating, a dry film coat containing an effective corrosion-inhibiting amount of the amine carboxylate VCI.

13 Claims, No Drawings

CORROSION RESISTANT COATINGS FOR METAL SURFACES

The current application claims a priority to the U.S. patent application Ser. No. 14/757,110 filed on Nov. 19, 2015.

FIELD OF THE INVENTION

The present invention relates to a corrosion resistant coating (e.g. paint) additive and the preparation of a corrosion resistant coating (e.g. paint) for metal surfaces containing the additive. In particular, the invention relates to a paint comprising a compatible additive which contains a concentrated solution of a migratory vapor phase corrosion inhibitor.

BACKGROUND OF THE INVENTION

Corrosion is an electrochemical process which leads to the deterioration and eventual destruction of exposed metal surfaces. The presence of conducting electrolyte, moisture and oxygen to successfully complete the electrical circuit on the thermodynamically unstable metal surface are the main factors of a corrosion process.

One of the most efficient ways to thwart corrosion is to shield metal surfaces from the environment with protective coatings. These coatings are of great importance for numerous civilian and military uses, including use on ship hulls and topside exterior surfaces, car underbodies, offshore drilling decks, bridges and supports, various fuel, potable water, chemical and sewage tanks, numerous structural and building uses, etc.

Over the years, coatings based on alkyd, urethane, vinyl, acrylic and epoxy paints and other technologies have been developed, and often have included corrosion inhibitor pigments such as zinc, aluminum, zinc oxide, modified zinc oxide and calcium ion-exchanged amorphous silica gel. Using corrosion inhibitor pigments has several disadvantages. Some pigments contain metals that are toxic. Several, including metallic zinc, have high densities and settle. A number of pigments react with resins in the coating. Additional pigmentation also requires added wetting agents that may affect corrosion resistance. Furthermore, such solid corrosion inhibitors require direct application to and contact with the metal surface in order to perform effectively.

Migratory vapor phase corrosion inhibitors have also been developed as additives to coatings to improve the corrosion resistant effect of the coating. These corrosion inhibitors are organic compounds that protect metal surfaces by emitting vapor such as an amine-based compound. The nitrogen on the amine has two electrons that are attracted to the polar metal surface. The corrosion inhibitor migrates to the surface of the metal surface, and when at the surface the rest of the molecule is very hydrophobic and repels water to significantly retard corrosion.

U.S. Pat. No. 4,812,503 describes certain migratory vapor phase corrosion inhibitors, such as amine carboxylates formed by reacting a secondary amine such as dicyclohexylamine with a carboxylic acid, and has shown them to migrate through the paint film following application to a metal surface to form an additional coating where the corrosion inhibitor is in direct contact with the metal surface and further protects the same from corrosion. However, a drawback of the corrosion inhibitor systems described in U.S. Pat. No. 4,812,503 is that the inhibitor is generally dissolved in a hydrocarbon solvent, such as naphtha or mineral spirits, before mixing with the paint and only achieves a concentration of inhibitor in solution of around 5 to 10 weight percent (wt. %). As such, it is necessary to add a large amount of the inhibitor-containing solution to the paint in order to obtain a sufficient concentration of inhibitor in the paint for it to be effective as a metal corrosion inhibitor. Having to add such a large volume of solvent lowers the paint solids content and reduces the dry film coverage per coat to an unacceptable level.

SUMMARY OF THE INVENTION

We have now found a solution product which can achieve concentrations of certain migratory vapor phase corrosion inhibitors in solution up to about 80 wt. %, and may therefore be used as an additive for compatible paints at significantly lower solution volumes than has been previously possible. The migratory vapor phase corrosion inhibitor is an amine carboxylate prepared from readily available secondary amines and carboxylic acids under standard condensation conditions and is hereinafter referred to as the "amine carboxylate VCI". The solvent is one that provides a concentration of amine carboxylate VCI greater than about 25 wt. % and is compatible with paint solvents and thinners common in the paint industry.

The present invention also describes coatings prepared by blending the new amine carboxylate VCI solution with compatible paints, such as 2-part epoxy paints, and their protective effect on non-corroded and corroded metal surfaces, especially ferrous metal surfaces, using standardized tests.

DETAILED DESCRIPTION OF THE INVENTION

The description is not to be taken in a limiting sense, but is made merely for the purpose of illustrating the general principles of the invention.

In a first aspect of the invention, we describe a highly concentrated solution suitable for use as part of a corrosion resistant coating for metal-surfaces, comprising an amine carboxylate VCI in a solvent wherein the concentration of the amine carboxylate VCI in solution is from at least 35 wt. % to about 80 wt. %.

In an alternative aspect of the invention, we describe a highly concentrated solution suitable for use as part of a corrosion resistant coating for metal surfaces, comprising an amine carboxylate VCI in a solvent wherein the concentration of the amine carboxylate VCI in solution is from at least 25 wt. % to about 80 wt. %, and wherein the solvent exhibits a Hansen Hydrogen Bonding Parameter (HHBP) in the range of 5 to 10 $(calories/cm^3)^{1/2}$.

The term "highly concentrated" as used with reference to the solutions described herein, means that the concentration of the amine carboxylate VCI in solution is at least 25 wt. %, more particularly at least 35 wt. % and is preferably about 40 wt. %, although higher concentrations up to about 80 wt. % are possible, including 50 wt. %, 60 wt. % and 70 wt. %.

The term "solution suitable for use as part of a corrosion resistant coating for metal surfaces" as used with reference to the solutions described herein, means that the liquid is clear and free flowing, and has a viscosity, as measured according to the Krebs index of less than 120. Preferably, solutions of the invention have a Krebs value from 30 to 100 at about 75° F. which reached equilibrium an ambient temperature, more preferably from about 35 to about 45 at about 75° F. which reached equilibrium the ambient temperature.

The Krebs viscosity measurements are made using an instrument that measures the time in seconds that it takes for a spindle immersed in a liquid to make 100 revelations where the spindle rotation is driven by a weight attached to a pulley connection to the spindle. The Krebs viscosity is a unit-less number determined from a conversion chart (Krebs Stromer) which correlates the driving weight and time in seconds with the Krebs viscosity factor. The Krebs viscosity factor can also be correlated to viscosity in Poise units. The Krebs Stormer chart starts at Krebs values of 42. For time/weight reading outside of the chart range a linear extrapolation can be made.

As used herein, the amine carboxylate VCI is a corrosion inhibitor capable of forming a vapor that migrates through paint and other sufficiently porous surfaces, such as corroded metal, including rust, to form a protective barrier coating on the surface of the metal.

In one embodiment, the amine carboxylate VCI is a compound of the formula (I)

$$R^1CO_2NR^2R^3 \qquad (I)$$

in which $R^1$ is a straight or branched chain alkyl group containing 6 to 18 carbon atoms, and $R^2$ and $R^3$ are each independently a straight or branched chain alkyl group containing 3 to 8 carbon atoms, or $R^2$ and $R^3$ are each independently a $C_5$ to $C_8$ cycloalkyl ring optionally substituted by a straight or branched chain alkyl group containing 1 to 3 carbon atoms and/or optionally containing an oxygen atom (—O—) to replace one of the ring methylene groups (—CH2-).

$R^1$ is, in particular, a straight chain alkyl group containing 8 to 14 carbon atoms, such as C8, C9, C10, C12 or C14 alkyl group, and is preferably a straight chain C12 alkyl group.

$R^2$ and $R^3$ are, in particular, each independently a $C_5$ to $C_8$ cycloalkyl ring optionally substituted by methyl, and are each preferably cyclohexyl.

In a preferred embodiment, the amine carboxylate VCI is a compound of formula (I) in which $R^1$ is a straight chain alkyl group containing 8 to 14 carbon atoms, especially having 12 carbon atoms, and $R^2$ and $R^3$ are both cyclohexyl.

It will be appreciated that, in solution, a compound of formula (I) may exist in the hydrated ionized form represented below as formula (Ia). It is to be understood that formula (I) herein is intended to embrace the corresponding hydrated compounds of formula (Ia):

$$R^1CO_2^-HN^+HR^2R^3 \qquad (Ia)$$

Solvents suitable for preparing solutions according to the invention where the concentration of the amine carboxylate VCI in solution is from 25% to about 80% have a Hansen Hydrogen Bonding Parameter (HHBP) in the range of 5 to 10 $(calories/cm^3)^{1/2}$, for example, in the range of 5 to 8 $(calories/cm^3)^{1/2}$.

The Hanson solubility parameter is a method for calculating the solvency power of liquids with respect to their non-polar, polar and hydrogen bonding solvent power values. We have found that for purposes of rating solvents for dissolving the VCI that the hydrogen bonding values are the best measures. The hydrogen bonding values are taken from the Eastman Chemical Solvent Selector chart available on the internet and presenting solvent Hansen Solubility Parameter hydrogen bonding values in units of $(calories/cm^3)^{1/2}$.

Specific examples of suitable solvents which fall within the desired HHBP range include alcohols of the formula R—OH where R is:

(i) a straight or branched chain $C_2$ to $C_6$ alkyl group optionally substituted by hydroxyl or phenoxy or contains a carbonyl group, or (ii) a group $CH_3(CH_2)x-A-(CH_2)y-O—(CH2)z-$ in which x is zero to 3 and z is 2 or 3 and where (a) y is zero to 3 and A is a bond or (b) y is 2 or 3 and A is 0.

R—OH may represent, for example, ethanol, n-propanol, i-propanol, n-butanol, s-butanol, t-butanol, neopentyl alcohol, diacetone alcohol, propylene glycol, 1,3-butanediol, hexylene glycol, 2-propoxyethanol and 2-butoxyethanol.

In one embodiment, R is a $C_2$ to $C_6$ alkyl group such as ethyl, isopropyl or n-butyl. Preferably, R is n-butyl and the alcohol is therefore n-butanol.

In a particularly embodiment, the amine carboxylate VCI is a compound of formula (I), including a compound of formula (Ia), in which $R^1$ is straight chain $C_{12}$ alkyl and $R^2$ and $R^3$ are both cyclohexyl. In a preferred embodiment, this amine carboxylate VCI is dissolved in n-butanol, especially at a concentration of from about 25 wt. % to about 70 wt. % (e.g. about 40 wt. %).

Paints or coatings of the epoxy, urethane, vinyl, alkyd and acrylic types when applied to clean metal surfaces in a manner where there are no defects in the coating may furnish a high level of protection of the metal from corrosion. However, if the coating suffers damage and the metal surface is exposed, corrosion may take place and the coating may delaminate from the surface.

Similarly, if the metal is in a corrosion active state as the result of having been exposed to a corrosive environment, such as seawater, or has a metal alloy content that forms anodic zones, further corrosion may take place under a fully in-tact coating due to the corrosion action of the metal and will lead to blistering and failure of the coating.

We have surprisingly found that coatings blended with the amine carboxylate VCI solution of the present invention significantly enhance the ability of the coating to resist metal corrosion when applied to both clean metal surfaces and metal surfaces which are damaged and/or corroded. Indeed, and very surprisingly, the amine carboxylate VCI-containing coating still has a beneficial corrosion resistant effect when the damaged and/or corroded metal has been previously coated with a paint that does not contain a corrosion inhibitor.

For solid ingredients, other than pigments, added to paints it is desirable that they be completely soluble and homogeneous in the dry paint film. VCI solutions that are gelatinous or multiphase are undesirable since they are unlikely to yield a homogeneous distribution of the VCI in the dry paint film.

Thus, in another embodiment, we provide a corrosion resistant coating for metal surfaces comprising a blend of the amine carboxylate VCI solution and a paint, wherein the paint includes an organic solvent that is compatible with the amine carboxylate VCI solvent.

The paint may be any which uses a solvent that is compatible with the solvent used to dissolve the amine carboxylate VCI. The term "compatible" means that the organic solvent is one which enables the paint and the amine carboxylate VCI to be blended to form a homogeneous mixture. Preferably, the paint solvent is the same solvent as that which is used to dissolve the amine carboxylate VCI.

The paint is preferably an epoxy paint, such as a 2-part polyamide epoxy paint Suitable examples include 2-part polyamide epoxy paints of the military specification class of MIL-DTL-24441.

Metals which may be protected by the amine carboxylate VC's of this invention are those metals which are normally corroded by water vapor in the air. Included are ferrous metals such as cast iron, steel, ferrous alloys such as galvanized steel and galvanized iron, and the like. Non-ferrous metals may also be protected and include copper and aluminum. The amine carboxylate VC's of the present invention are particularly effective when applied to ferrous metal surfaces such as steel surfaces.

In another embodiment, we provide a corrosion resistant coating for ferrous metal surfaces consisting essentially of a blend of the amine carboxylate VCI solution of this invention and a paint, wherein the paint includes an organic solvent that is compatible with the amine carboxylate VCI solvent.

The amine carboxylate VCI solution of this invention and the paint are preferably mixed in amounts that will, when coated onto the metal surface, achieve a concentration of amine carboxylate VCI solids equal to about 1 wt. % to about 5 wt. % of total coated dry film solids, and particularly about 2 wt. % to about 3 wt. %.

In another embodiment, we provide a process for preparing a corrosion resistant coating for metal surfaces comprising:

a. reacting a carboxylic acid $R^1CO_2H$ (in which $R^1$ is a straight or branched chain alkyl group containing 6 to 18 carbon atoms) with a solution of an amine $R^2R^3NH$ (in which $R^2$ and $R^3$ are each independently a straight or branched chain alkyl group containing 3 to 8 carbon atoms, or $R^2$ and $R^3$ are each independently a $C_5$-$C_8$ cycloalkyl ring optionally substituted by a straight or branched chain alkyl group containing 1 to 3 carbon atoms and/or optionally containing an oxygen atom (—O—) to replace one of the ring methylene groups (—$CH_2$—)) in a solvent R—OH where R is: a straight or branched chain $C_2$ to $C_6$ alkyl group optionally substituted by hydroxyl or phenoxy or contains a carbonyl group, or a group $CH_3(CH_2)x$-A-$(CH_2)y$-O—$(CH_2)z$- in which x is zero to 3 and z is 2 or 3 and where (a) y is zero to 3 and A is a bond or (b) y is 2 or 3 and A is O to provide a solution of a compound of formula (I)

$$R^1CO^2NR^2R^3 \quad (I);\text{ and}$$

b. blending the formed amine carboxylate VCI solution with a paint, including blending with Part A and/or Part B of a 2-part paint when used; followed by combining Part A and Part B of a 2-part paint when used.

It will be appreciated that the solvent R—OH described in the process just above may be replaced by alternative solvents with the requisite HHBP value or solvating characteristics.

In a particular embodiment, we provide a process for making an amine carboxylate VCI solution from a combination of one of a C-8, C-10, C-12 or C-14 carboxylic acid with an organic secondary amine such as dicyclohexylamine (DCA), by adding the starting materials in about equimolar amounts to the solvent in a total quantity to achieve about a 40 wt. % solution of the amine carboxylate VCI.

It is important when a 2-part epoxy coating is used for the amine carboxylate VCI solution to be compatible with at least Part A and/or Part B of the two part paint.

Preferably, the solvent (or thinner) used in Part A and/or Part B is the same solvent as that which is used as the amine carboxylate VCI solvent.

In certain embodiments, other types of corrosion inhibitors may be added to paint such as zinc and aluminum pigments and chromates. However, for these to perform they need to be in direct contact with the metal surface. A further advantage of amine carboxylate VCIs is that they can perform effectively as corrosion inhibitors without the coating containing the amine carboxylate VCI being in direct contact with the metal surface.

Thus, suitable additional agents which may enhance the overall performance of the paint containing the amine carboxylate VCI solution of the present invention include one or more of chemically compatible agents such as (a) pigments normally added to give body to the paint, provide a decorative effect and help protect the metal surface and the dry film coat from ultra violet rays, and colorants (b) inorganic corrosion inhibitors, including: chromates such as zinc chromate; nitrates such as ferric nitrate; phosphates such as polyphosphates and oxides thereof; molybdates such as zinc molybdates; borates such as zinc borates and so on (c) fungicides (d) dryers (e) mildewcides {f} ultra violet absorbers (g) anti-skimming agents etc.

EXAMPLES (A) Preparation of Amine Carboxylate VCI Solutions

Solutions of 5 types of amine carboxylate VCIs were made by separately reacting dicyclohexylamine (DCA) dissolved in n-butyl alcohol (NBA) with each of the following organic acids: octanoic acid (C-8), nonanoic (C-9), decanoic acid (C-10), dodecanoic acid (C-12) and tetradecanoic acid (C-14) in a 50/50 molar ratio to form a 40 wt. % solution of the product amine carboxylate VCI in NBA. DCA was added to NBA followed by the relevant organic acid with mixing to form a clear solution of the product amine carboxylate VCI. Table I records the weights of the ingredients used to make the 40 wt. % solutions of the amine carboxylate VCIs.

TABLE 1

| Example | Acid | Acid Weight (g) | DCA Weight (g) | NBA Weight (g) | VCI Weight % | Krebs Viscosity |
|---|---|---|---|---|---|---|
| 1 | C-8 | 35.2 | 44.8 | 120 | 40 | 40 |
| 2 | C-10 | 38.4 | 41.6 | 120 | 40 | 40 |
| 3 | C-12 | 105.0 | 95.0 | 300 | 40 | 40 |
| 4 | C-14 | 111.4 | 88.6 | 300 | 40 | 40 |
| 5 | C-12 | 95.5 | 85.6 | 120 | 60 | 45 |
| 6 | C-12 | 126.0 | 114.0 | 60.0 | 80 | 100 |
| 7 | C-9 | 41.9 | 48.1 | 210 | 30 | 35 |
| 8 | C-9 | 69.9 | 80.1 | 150 | 50 | 40 |

Each of Examples 1 to 5, 7 and 8 in Table 1 were prepared as clear and free flowing solutions with Krebs viscosities from 35 to 45 at about 75° F. which reached equilibrium the ambient temperature. In Example 6, the product formed a high viscosity gel which became a clear homogeneous solution with a Krebs viscosity of 100 after stirring.

TABLE 2

| Solvent | C-12 Acid Weight (a) | DCA Weight (a) | Solvent Weight (a) | VCI Weight % | HHBP (Calories/$cm^3$)$^{1/2}$ |
|---|---|---|---|---|---|
| Diacetone alcohol | 52.5 | 47.5 | 150 | 40 | 5.3 |
| 2-Butoxyethanol | 55.2 | 50.0 | 157.8 | 40 | 6.0 |
| N-Butanol | 150 | 95 | 300 | 40 | 7.7 |
| Ethyl acetate | 55.2 | 50.0 | 157.8 | See below | 3.5 |

Attempts were made to prepare 40 wt. % solutions of the C-12 amine carboxylate VCI in a similar manner to solutions in Table 1, but using alternative solvents to N-butyl alcohol (and using N-butyl alcohol as a standard).

Clear and free flowing solutions resulted using diacetone alcohol, 2-butoxyethanol and N-butanol where each has a Hansen Hydrogen Bonding Parameter (HHBP) value within the range of 5-10 $(Calories/cm^3)^{1/2}$. A clear and free flowing solution also resulted using 1-Chloro-4-(trifluoromethyl) benzene (PCTFB). Ethyl acetate, having an HHBP value of 3.5, formed a homogeneous 15 wt. % of the C-12 amine carboxylate VCI. However, ethyl acetate was only partially soluble at 25 wt. % of the C-12 amine carboxylate VCI, with visible undissolved solids present.

Each of the acceptable solvents capable of preparing 40 wt. % solutions of the C-12 amine carboxylate VCI has a Hansen Hydrogen Bonding Parameter (HHBP) value within the range of 5-10 $(Calories/cm^3)^{1/2}$.

TABLE 3

| Solvent | C-9 Acid Weight (a) | DCA Weight (a) | Solvent Weight (a) | VCI Weight % | HHBP $(Calories/cm^3)^{1/2}$ | Krebs Viscosity |
|---|---|---|---|---|---|---|
| Mineral Spirits | 41.9 | 48.0 | 210 | 30 | 0.0 | >143 |

Table 3 reports an attempt to make a C-9 VCI solution using mineral spirits (HHBP of zero) as solvent. A 30 wt. % combination of the VCI and solvent gave a thick gel-like mixture having a Krebs viscosity level which could not be measured (above upper limit of Krebs scale). As such, the mixture was unsuitable for use as a paint additive.

(B) Preparation of Coatings Containing Amine Carboxylate VCIs

The 40 wt. % solutions of the amine carboxylate VCIs prepared in (A) above were each separately added to part A of a 2 part polyamide epoxy primer paint MIL-DTL-4441/20A, formula 150, Type Ill in a quantity to achieve a 2 to 3 wt. % of amine carboxylate VCI solids in the final dry film when the Parts A and B were combined and the paint was applied to a metal surface and allowed to dry and cure. Table 4 documents the amounts of each amine carboxylate VCI solution and the primer paint Part A that were used to make paint samples for coating steel test panels.

TABLE 4

| Amount of VCI solution | Amount of Epoxy Part A | Wt % VCI Solids |
|---|---|---|
| 4 ml | 50 ml | 2 |
| 5 ml | 50 ml | 2.5 |
| 6 ml | 50 ml | 3 |

The Part A primer was mixed with the amine carboxylate VCI solution at each of the above ratios and then separately combined with Part B in a 1:1 volume ratio to provide a volume of paint sufficient to feed an airless spray system for application of the primer paint to steel test panels.

(C) Performance Test Methods

The following processes use standard methodologies available from the American Section for Testing Materials known as ASTM. Details on these standards can be obtained from the ASTM web site www.ASTM.org. For example, ASTM D1654 is a Standard Test Method for the valuation of painted or coated specimens subject to corrosive environments. ASTM D610 describes the standard practice for evaluating the degree of rusting on painted steel surfaces. ASTM D3359 describes the Standard Test Method for measuring adhesion by a tape test. ASTM B117 describes the standard procedure for operating a salt spray (fog) apparatus. The apparatus consists of a closed chamber wherein a 5% salt solution is atomized onto test specimens via spray nozzles. The temperature is maintained at about 37° C. and the volume of solution is about 400 liters. Performance is measured in terms of the number of hours of exposure.

Steel panels are X scribed on one side to facilitate measurement of the impact of corrosion on creep of the coating away from the X scribe area on a scale of 0 to 10 where 10 is no creep per ASTM D1654. The amount of corrosion on the non-scribed side is observed and measured on a scale of 0 to 10 where 10 is no observable rust per the method described in ASTM D610. The level of paint adhesion to the steel panels may be measured in accordance with ASTM D3359 where a rating of 5B equals no loss of coating and 100% adhesion. Alternatively, the level of paint adhesion to the steel panels may be measured in accordance with ASTM D4541 Annex A4, which determines the force in PSI required to remove paint film from a surface.

(D) Performance Results

The tests hereinafter were performed using a salt (fog) chamber. This is an accelerated exposure test designed to exaggerate the impact of corrosive damage caused by salt water, and to demonstrate the unique value of adding amine carboxylate VCI agents to coatings to protect steel already in a corrosion active state as well as protect fresh steel surfaces from corrosion. A 5% sodium chloride solution is misted on the test panels set at a 15 degree angle at 37° C. (98° F.) for the relevant period of time. The panels are removed, rinsed and rated for the degree of corrosion damage.

Exhibits 1 and 2: Abraded White Steel Panels Coated with Epoxy Primer Containing the C-10 Amine Carboxylate VCI {Example 2 in Table 1} Vs. A Coated Control Five ASTM A1008 steel panels that had previously had the surface abraded by exposure to 80 grit black beauty per MIL 23331 were coated with the epoxy primer containing 2.5 wt. % amine carboxylate VCI equivalent of the C-10 amine carboxylate VCI (Exhibit 2 hereinafter) and were X scribed on one side. Five similar panels were coated with a control (Exhibit 1) using the same epoxy primer (without the amine carboxylate VCI) containing NBA in the same quantity as in Exhibit 2. The panels were allowed to dry and cure for seven day and were then X scribed on one side. Four of each set of panels were placed in the salt (fog) chamber and exposed for 500 hours. One panel from each set was used to measure the film adhesion level and thickness.

Exhibits 3 to 6: Salt {Fog} Corroded Abraded Steel Panels Coated with Epoxy Primer Containing the C-10 and C-12 Amine Carboxylate VCIs (Examples 2 and 3 of Table 1) Vs. a Coated Control Twenty black beauty abraded ASTM A1008 steel panels were first exposed to salt water in a salt (fog) chamber for 24 hours to cause surface corrosion and salt contamination. The panels were rinsed and loose rust was removed using an abrasive pad. Five of each panel were then either coated with the epoxy primer containing the C-10 and C-12 amine carboxylate VCIs (Exhibits 4 and 5 respectively hereinafter), or coated with the epoxy primer containing the C-10 amine carboxylate VCI followed by a top-coat of MIL-PRE-85285 (Exhibit 6 hereinafter), or coated with a control (Exhibit 3 hereinafter) using the same epoxy primer (without the amine carboxylate VCI) containing NBA in the same quantity as in Exhibits 4, 5 and 6. The panels were allowed to dry and cure for seven day and were then X scribed on one side. Four of each set of panels were placed in the salt (fog) chamber and exposed for 500 hours. One panel from each set was used to measure the film adhesion level and thickness.

Exhibits 7 to 10: Salt (Fog) Corroded Smooth Steel Panels Coated with Epoxy Primer Containing the C-8 and C-10 Amine Carboxylate VCIs (Examples 1 and 2 of Table 1) Vs. a Coated Control Twenty smooth steel panels were exposed in salt (fog) chamber for 24 hours to cause surface corrosion and salt contamination. The panels were rinsed and loose rust was removed using an abrasive pad. Five of each panel were then either coated with epoxy primer containing the C-8 amine carboxylate VCI added to achieve a 2.0 wt. % or 3.0 wt. % in the dry film (Exhibits 8 and 9 respectively hereinafter), or coated with the C-10 amine carboxylate VCI added to achieve a 2.0 wt. % in the dry film (Exhibit 10 hereinafter), or coated with a control (Exhibit 7 hereinafter) using the same epoxy primer {without the amine carboxylate VCI) containing NBA in the same quantity as in Exhibits 7, 8 and 9. The panels were allowed to dry and cure for seven day and were then X scribed on one side. Four of each set of panels were placed in the salt (fog) chamber and exposed for 500 hours. One panel from each set was used to measure the film adhesion level and thickness.

TABLE 5

| Exhibit No. | VCI type used | Wt % VCI Solids | No. of tests |
|---|---|---|---|
| 3 | None* | Not applicable | 5 |
| 4 | C-10 | 2.5 | 5 |
| 5 | C-12 | 2.5 | 5 |
| 6 | C-10** | 2.5 | 5 |
| 7 | None* | Not applicable | 5 |
| 8 | C-8 | 2.0 | 5 |
| 9 | C-8 | 3.0 | 5 |
| 10 | C-10 | 2.0 | 5 |

*NBA added
**With a 2-part urethane top-coat MIL-PRE-85285 (an aliphatic polyurethane paint)

Table 6 presents the test results for all 10 of the test panel groups exposed to the salt {fog) chamber test. The numerical results shown are the averaged results from all of the test panel experiments. Although there may be some minor variation between individual results, the results individually and as averaged consistently show that addition of 2.5 wt. % and 3.0 wt. % of the amine carboxylate VCI reduced the degree of paint failure and steel corrosion as measured in terms of coating creep and formation of rust spots on the coated surface.

TABLE 6

| Exhibit No. | Dry Film thickness (mil) | Film adhesion | Film creep | Degree of rust |
|---|---|---|---|---|
| 1 | 2.4 | 5B | 5 | 4 |
| 2 | 2.4 | 4B | 6.5 | 9 |
| 3 | 2.3 | 2B | 3.5 | 3 |
| 4 | 3 | 5B | 6 | 7 |

TABLE 6-continued

| Exhibit No. | Dry Film thickness (mil) | Film adhesion | Film creep | Degree of rust |
|---|---|---|---|---|
| 5 | 2 | 5B | 6 | 9 |
| 6 | 3.5 | 4B | 6.5 | 9 |
| 7 | 4.2 | 2B | 6 | 7 |
| 8 | 4.3 | 4B | 6 | 10 |
| 9 | 4.3 | 3B | 7 | 10 |
| 10 | 4.5 | 4B | 9 | 10 |

Comparison of Exhibit 1 (control) and Exhibit 2 shows that the addition of 2.5 wt. % of C-10 type amine carboxylate VCI to the epoxy primer applied on black beauty abraded steel panels reduces the degree of creep from 5.0 to 6.5 and the level of observed corrosion on coating surface from 4 to 9.

Comparison of Exhibit 3 (control) and Exhibit 4 shows that addition of 2.5 wt. % of the C-10 amine carboxylate VCIs resulted in a significant reduction in the level of creep and rust spot formation. Creep scale level changed from 3.5 to 6, and the degree of observed corrosion changed from 3 to 7. Exhibit 5 demonstrates that the C-12 amine carboxylate VCI at 2.5 wt. % further improves corrosion resistance with the degree of observed corrosion changed to 9. These results establish the C-12 amine carboxylate VCI at 2.5 wt. % in the final dry paint film as preferred.

Exhibit 6 demonstrates how the addition of a 2 part urethane top-coat to the epoxy primer of Exhibit 4 slightly improves the creep level and significantly improves the observed corrosion level (from 7 to 9).

Comparison of Exhibit 7 (control) and Exhibit 8 shows that the C-8 amine carboxylate VCI, while not having a measurable impact on creep, did reduce the amount of observed corrosion on the coating surface. Exhibit 9 demonstrates an improvement in creep when the amount of C-8 amine carboxylate VCI is increased to 3 wt. %. The most significant results are the large reduction in the impact of creep and corrosion by the addition of 2.5 wt. % of the C-10 amine carboxylate VCI (Exhibit 10). Creep was reduced from a scale level of 6 to 9 and the observed formation of rust spots was reduced from 7 to 10.

Testing has further been performed comparing performance between the above described polyamide epoxy containing the C-12 VCI at 2.5 Wt. % in dry film with a commercial 2-part epoxy primer made by Sherwin Williams designated B67A5 (part 1) and B67V5 (part 2) containing a zinc phosphate corrosion inhibitor. The primers were applied to commercial hot-rolled steel panels abraded to form a 1 to 2 mil surface profile and SSPC Rust Grade C Panels. Panels were coated with the 2-part epoxy primer (MIL-DTL 24441/20A) with and without the VCI added and with the Sherwin Williams 2-part epoxy primer. The panels were allowed to cure for 10 days and the dry film thickness and surface adhesion measured. The panels were then placed in a salt fog chamber for 750 hours, removed and evaluated as previously described. Table 7 reports the average results from 3 exposed panels, including film thickness and adhesion quality results.

TABLE 7

| Exhibit No. | Surface Type | VCI type used | Dry Film thickness (ml) | Film adhesion (PSI) | Film creep (mm) | Degree of rust Front | Degree of rust Back |
|---|---|---|---|---|---|---|---|
| 1 | White steel | None | 3.9 | 1843 | 0.9 | 10 | 10 |
| 2 | White steel | C-12 | 4.7 | 2052 | 0.4 | 10 | 10 |
| 3 | Rusted steel | None | 5.8 | 1344 | 1.1 | 9 | 9 |

TABLE 7-continued

| Exhibit No. | Surface Type | VCI type used | Dry Film thickness (ml) | Film adhesion (PSI) | Film creep (mm) | Degree of rust Front | Back |
|---|---|---|---|---|---|---|---|
| 4 | Rusted steel | C-12 | 6.2 | 1222 | 0.8 | 9 | 10 |
| 5 | White steel | None | 5.3 | 1480 | 0.6 | 10 | 10 |
| 6 | Rusted steel | None | 8.7 | 1085 | 0.9 | 7 | 9 |

Exhibits 1 to 4 present conditions of white and rusted steel panels coated with the epoxy primer MIL-DTL-24441/20A with and without the VCI added. Exhibits 5 and 6 present conditions of white and rusted steel panels coated with the Sherwin Williams 2-part primer with zinc phosphate added as the corrosion inhibitor.

The results demonstrate that the addition of the C-12 VCI to the 2-part epoxy primer MIL-DTL-24441/20A had no negative impact on adhesion strength, and gave advantages in reduced film creep and surface corrosion. The coating containing the C-12 VCI gave similar corrosion protection on white steel as the Sherwin Williams primer with added zinc phosphate. However, the Sherwin Williams primer with added zinc phosphate was inferior in exhibiting a lower degree of adhesion to white and rusted steel panels than panels coated with the epoxy primer MIL-DTL-24441/20A with and without the VCI added. Furthermore, the coating containing the C-12 VCI gave superior performance compared to the Sherwin Williams primer with added zinc phosphate on rusted steel panels in terms of film creep and surface corrosion.

It should be understood, of course, that the foregoing relates to exemplary embodiments of the invention and that modifications may be made without departing from the spirit and scope of the invention as set forth in the following claims.

What is claimed is:

1. A corrosion resistant device comprising:
   a metal surface;
   a corrosion resistant coating;
   the corrosion resistant coating comprising a blend of a highly concentrated solution and a paint;
   the highly concentrated solution comprising an amine carboxylate vapor phase migratory corrosion inhibitor (VCI) of the formula (I)

   $$R^1CO_2NR^2R^3 \quad (I)$$

in which $R^1$ is a straight or branched chain alkyl group containing 6 to 18 carbon atoms, and $R^2$ and $R^3$ are each independently a straight or branched chain alkyl group containing 3 to 8 carbon atoms, or $R^2$ and $R^3$ are each independently a $C_{5-8}$ cycloalkyl ring optionally substituted by a straight or branched chain alkyl group containing 1 to 3 carbon atoms and/or optionally containing an oxygen atom (—O—) to replace one of the ring methylene groups (—CH$_2$—), and in a solvent, wherein the concentration of the amine carboxylate VCI is from 40 wt. % to 60 wt. %, and a Krebs Viscosity Index is from 100 to 1600 centipoise (Cp) at about 75° F.; and
   the paint comprising an organic solvent that is compatible with the amine carboxylate VCI.

2. The corrosion resistant device according to claim 1, wherein $R^2$ and $R^3$ are both $C_{5-8}$ cycloalkyl groups optionally substituted by methyl.

3. The corrosion resistant device according to claim 1, wherein the solvent in the highly concentrated solution is an alcohol of the formula R—OH where R is:
   (i) a straight or branched chain $C_3$ to $C_6$ alkyl group optionally substituted by hydroxyl or phenoxy or contains a carbonyl group, or
   (ii) a group $CH_3(CH_2)_x$-A-$(CH_2)_y$—O—$(CH_2)_z$ in which x is zero to 3 and z is 2 or 3 and where (a) y is zero to 3 and A is a bond or (b) y is 2 or 3 and A is O.

4. The corrosion resistant device according to claim 3, wherein R is a straight or branched chain $C_3$ to $C_6$ alkyl group.

5. The corrosion resistant device according to claim 1, wherein the solvent in the highly concentrated solution is n-butanol.

6. The corrosion resistant device according to claim 1, wherein the solvent in the highly concentrated solution is 1-chloro-4-(trifluoromethyl)benzene.

7. The corrosion resistant device according to claim 1, wherein the concentration of the amine carboxylate VCI is about 50 wt. %.

8. The corrosion resistant device according to claim 1, wherein the paint includes an alcohol of the formula R—OH as the solvent where R is: (i) a straight or branched chain C3 to C6 alkyl group optionally substituted by hydroxyl or phenoxy or contains a carbonyl group, or (ii) a group CH3(CH2)x-A-(CH2)y-O—(CH2)z- in which x is zero to 3 and z is 2 or 3 and where (a) y is zero to 3 and A is a bond or (b) y is 2 or 3 and A is O.

9. The corrosion resistant device according to claim 1, wherein the paint includes n-butanol as the solvent.

10. The corrosion resistant device according to claim 1, wherein the metal surface contains iron.

11. The corrosion resistant device according to claim 1, wherein the metal surface is a corroded ferrous metal surface.

12. The corrosion resistant device according to claim 1, which achieves a concentration of amine carboxylate VCI solids equal to about 1 wt. % to about 5 wt. % of total coated dry film solids when applied to the metal surface.

13. The corrosion resistant device according to claim 1, which achieves a concentration of amine carboxylate VCI solids equal to about 2 wt. % to about 3 wt. % of total coated dry film solids when applied to the metal surface.

* * * * *